United States Patent
Boddy et al.

(12)
(10) Patent No.: US 6,919,796 B2
(45) Date of Patent: Jul. 19, 2005

(54) DIMMING MIRROR WITH BLIND ZONE SUB-MIRROR AND INDICATOR

(75) Inventors: Ian Boddy, Ada, MI (US); Keith D. Foote, Grand Rapids, MI (US); Volker Christian Rudinitzki, Grand Rapids, MI (US)

(73) Assignee: Magna Donnelly Mirrors North America, LLC, Kentwood, MI (US)

( * ) Notice: Subject to any disclaimer, the term of this patent is extended or adjusted under 35 U.S.C. 154(b) by 124 days.

(21) Appl. No.: 10/605,180

(22) Filed: Sep. 12, 2003

(65) Prior Publication Data

US 2004/0114262 A1 Jun. 17, 2004

Related U.S. Application Data

(60) Provisional application No. 60/319,638, filed on Oct. 21, 2002, and provisional application No. 60/319,545, filed on Sep. 12, 2002.

(51) Int. Cl.$^7$ ................................................ B06Q 1/00
(52) U.S. Cl. .................. 340/425.5; 340/903; 362/494; 359/838
(58) Field of Search ............................. 701/1, 300–301; 340/425.5, 435–438, 463, 555, 691.3, 903, 933, 942–943; 359/838, 842, 548–549, 850–851; 362/494; 180/167–169

(56) References Cited

U.S. PATENT DOCUMENTS

| | | |
|---|---|---|
| 5,624,176 A | 4/1997 | O'Farrell et al. |
| 5,721,646 A | 2/1998 | Catlin et al. |
| 5,786,772 A | 7/1998 | Schofield et al. |
| 6,074,077 A | 6/2000 | Pastrick et al. |
| 6,086,229 A | 7/2000 | Pastrick |
| 6,099,155 A | 8/2000 | Pastrick et al. |
| 6,149,287 A | 11/2000 | Pastrick et al. |
| 6,165,234 A | 12/2000 | Kanakkanatt |
| 6,176,602 B1 | 1/2001 | Pastrick et al. |
| 6,276,821 B1 | 8/2001 | Pastrick et al. |
| 6,286,423 B1 | 9/2001 | McCue et al. |
| 6,296,379 B1 | 10/2001 | Pastrick |
| 6,299,333 B1 | 10/2001 | Pastrick et al. |
| 6,416,208 B2 | 7/2002 | Pastrick et al. |
| 6,420,036 B1 | 7/2002 | Varaprasad et al. |
| 6,474,853 B2 | 11/2002 | Pastrick et al. |
| 6,690,268 B2 * | 2/2004 | Schofield et al. ........... 340/438 |
| 6,744,353 B2 * | 6/2004 | Sjonell ....................... 340/435 |
| 6,753,766 B2 * | 6/2004 | Patchell ...................... 340/436 |
| 2002/0041442 A1 | 4/2002 | Witt |
| 2002/0082777 A1 * | 6/2002 | Halsted et al. .............. 701/301 |

* cited by examiner

*Primary Examiner*—Jeffery Hofsass
*Assistant Examiner*—George A Bugg
(74) *Attorney, Agent, or Firm*—McGarry Bair PC

(57) ABSTRACT

A rearview mirror system comprises a spotter mirror for providing an image of an object in a vehicle's blind zone to the vehicle's operator. A recognition enhancement device is provided with the spotter mirror for drawing the attention of the driver to the spotter mirror when an overtaking vehicle enters the driver's blind zone. The signaling display is activated by a sensing system which senses the presence of the overtaking vehicle in the blind zone. An electrochromic element is incorporated into the spotter mirror to reduce the intensity of light transmitted from the object and reflected from the spotter mirror. Activation of the electrochromic element to darken the spotter mirror will induce the operator to observe the object in the spotter mirror.

25 Claims, 19 Drawing Sheets

DIMMING MIRROR WITH BLIND ZONE SUB-MIRROR AND INDICATOR

CROSS REFERENCE TO RELATED APPLICATIONS

This application claims the benefit of U.S. provisional applications Ser. Nos. 60/319,545, filed Sep. 12, 2002, and 60/319,638, filed Oct. 21, 2002, which are incorporated herein in their entirety.

BACKGROUND OF INVENTION

1. Field of the Invention

The invention relates to mirrors for automotive vehicles. In one aspect, the invention relates to a mirror with a blind zone sub-mirror associated with a recognition enhancement device initiated by the detection of an overtaking vehicle entering the vehicle operator's blind zone. In another aspect, the invention relates to a recognition enhancement device initiated by the detection of an overtaking vehicle entering the vehicle operator's blind zone which induces the operator to monitor the blind zone sub-mirror. In another aspect, the invention relates to a dimming mirror with an automatically dimming blind zone sub-mirror.

2. Description of the Related Art

The operator of a motor vehicle which is being overtaken by a second motor vehicle will typically be unable to observe the position of the overtaking vehicle once that vehicle enters the operator's "blind zone." A collision between the two vehicles can occur when the vehicle being overtaken moves into the path of the overtaking vehicle because the operator is unaware of the presence of the overtaking vehicle in the operator's blind zone. Rearview mirrors are thus frequently provided with a small spotter mirror incorporated into the rearview mirror assembly, particularly for use with larger vehicles such as pickup trucks and SUVs. The spotter mirror eliminates much or all of the "blind spot" experienced by a driver using a rearview mirror assembly without the spotter mirror. Typically, the spotter mirror comprises a convex mirror element which is mounted to the outer glass portion of the rearview mirror assembly.

Sensing and signaling devices have also been developed which are capable of detecting the presence of a vehicle in an operator's blind zone and alerting the operator to that vehicle through a visual or audio signal. However, although the operator may be alerted to the presence of the overtaking vehicle, the vehicle will not appear in the rearview mirror of the vehicle being overtaken if it is in the operator's blind zone. Thus, unless the rearview mirror incorporates a spotter mirror, the operator must maintain his or her vehicle's position in the roadway until the overtaking vehicle enters the field of view in the rearview mirror, or the operator must look rearward to determine the position of the overtaking vehicle, thereby taking his or her eyes off the road. Even with a spotter mirror, the driver may fail to utilize the spotter mirror, or may not be sufficiently alerted to the necessity of using the spotter mirror, and a collision may ensue with a vehicle in the operator's blind zone.

Prior art spotter mirrors also suffer from another limitation. Light impinging on the spotter mirror element from behind the vehicle, particularly during nighttime driving, can become distorted and reflected to the driver in such a way that the image from the rearview mirror is distorted or otherwise adversely affected, thereby reducing the effectiveness and safety features of the rearview mirror. Furthermore, the intensity of the light reflected from the spotter mirror element will often compel the operator to direct his or her eyes away from the rearview mirror, further reducing the effectiveness of the rearview mirror.

Rearview mirrors can be provided with an automatically dimming feature which reduces the reflected glare from light, particularly vehicle headlamps. This automatically dimming feature typically comprises a light-reactive electrochromic layer interposed between two mirror glasses to form a sandwich structure. When bright light is detected by the electrochromic layer, the electrochromic layer darkens to dim the mirror. However, a spotter mirror attached to the exterior of the mirror glass will not be affected by the darkening of the electrochromic layer. Thus, the spotter mirror will reflect light from a headlamp to the vehicle operator with no reduction in intensity.

SUMMARY OF INVENTION

In one aspect, the invention relates to a vehicular rearview mirror system for indicating to a vehicle operator the detection of an object in the vehicle's blind zone comprises a first reflective element for providing the operator with a rearward view, a second reflective element associated with the first reflective element that is adapted to provide an image to the operator of the object in the vehicle's blind zone adjacent to the rearward view which is not generally observable by the operator in the rearward view, and a recognition enhancement device associated with at least the second reflective element for enhancing the operator's recognition of the object in the vehicle's blind zone, wherein the recognition enhancement device is actuated upon detection of the object in the vehicle's blind zone to effectively draw the operator's visual attention to the second reflective element.

The recognition enhancement device can comprise a transmission device for transmitting into the blind zone a signal adapted for reflection from the object. The signal can comprise one of an infrared, optical, radar, sonar or ultrasonic signal. The recognition enhancement device can also comprise a sensing element for sensing the signal reflected from an object in the blind zone or a signaling device.

The signaling device can comprise at least one point-type light, at least one incandescent light, at least one light-emitting diode, or at least one illuminated signal marker. The at least one illuminated signal marker can comprise at least one incandescent light, or at least one light-emitting diode.

The signaling device can also comprise at least one remote display. The at least one remote display can comprise a camera adapted to capture an image of the object in the vehicle's blind zone and one of a cathode ray-type television monitor, a liquid crystal display, or a plasma display for displaying the image of the object.

The signaling device can comprise at least one peripheral signal light extending along the periphery of the second reflective element. The at least one peripheral signal light can comprise at least one incandescent light, or at least one light-emitting diode.

The signaling device can also comprise a numerical display for indicating the distance separating the vehicle from the object. The numerical display can comprise at least one incandescent light, or at least one light-emitting diode.

The signaling device can also comprise at least one peripheral signal light extending along the periphery of the first reflective element. The at least one peripheral signal light can comprise at least one incandescent light, or at least one light-emitting diode.

The recognition enhancement device can also comprise an electrochromic layer adapted to reduce the intensity of light transmitted from the object and reflected from the second reflective element. The electrochromic layer can be adapted to darken upon detecting light from the object, or adapted to reduce the intensity of light reflected from both the first reflective element and the second reflective element.

DETAILED DESCRIPTION

Figure 1:
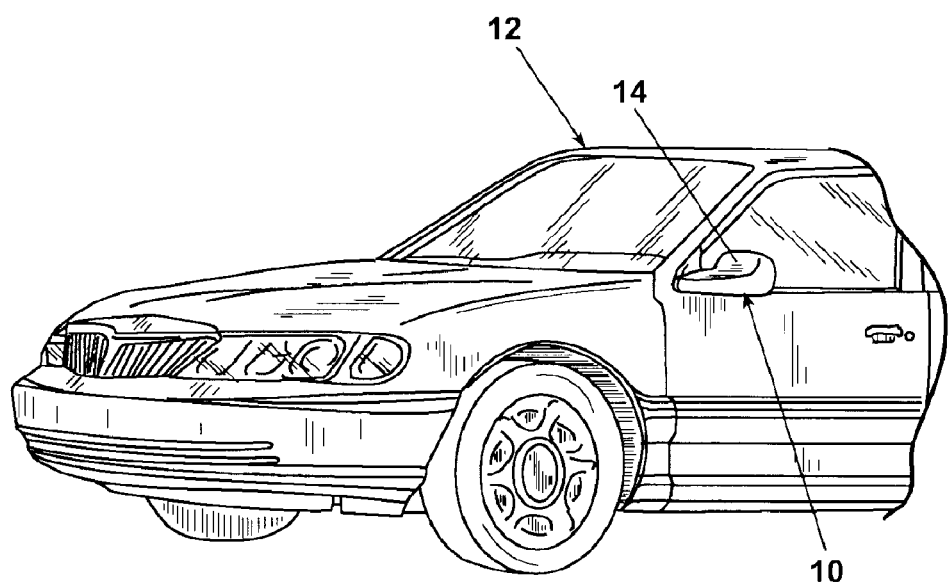
FIG. 1 is a perspective view of a portion of an automotive vehicle having a rearview mirror system according to the invention.

As shown in FIG. 1, a rearview mirror system 10 according to the invention is installed on an automotive vehicle 12 on or near the front of the driver's side door. An identical mirror system can be similarly mounted to the vehicle 12 on the passenger's side. The description of the structure and operation of the mirror system presented hereinafter will be equally applicable to both mirror systems.

Figure 2:
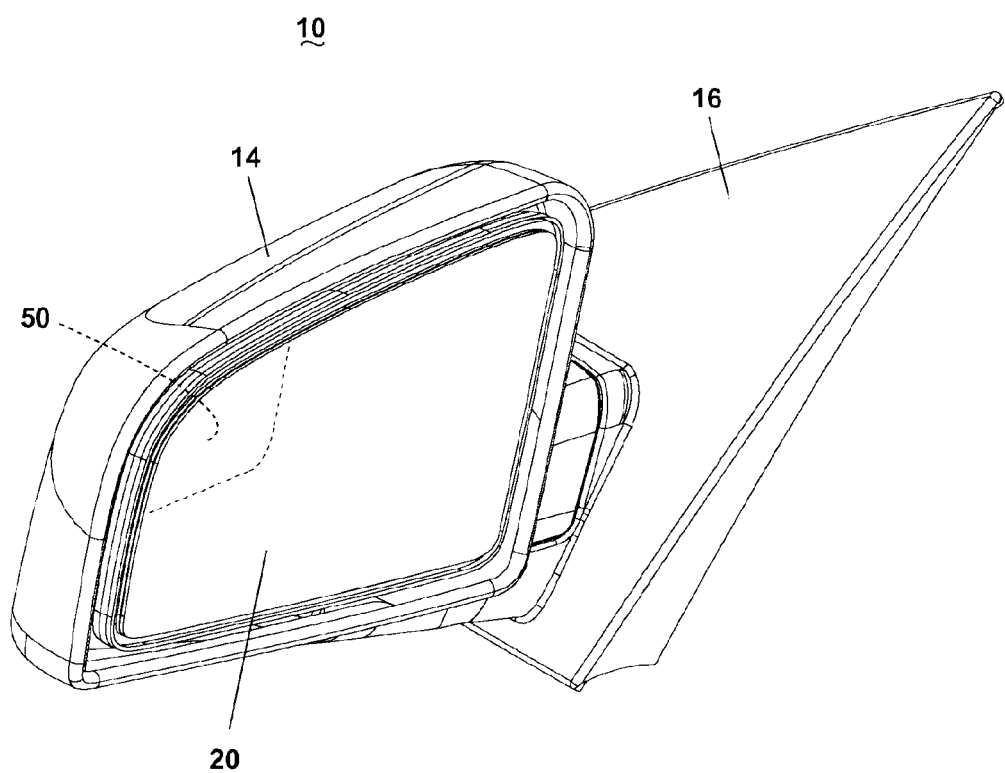
FIG. 2 is a close-up perspective view of an embodiment of the rearview mirror system of FIG. 1.
Figure 3:
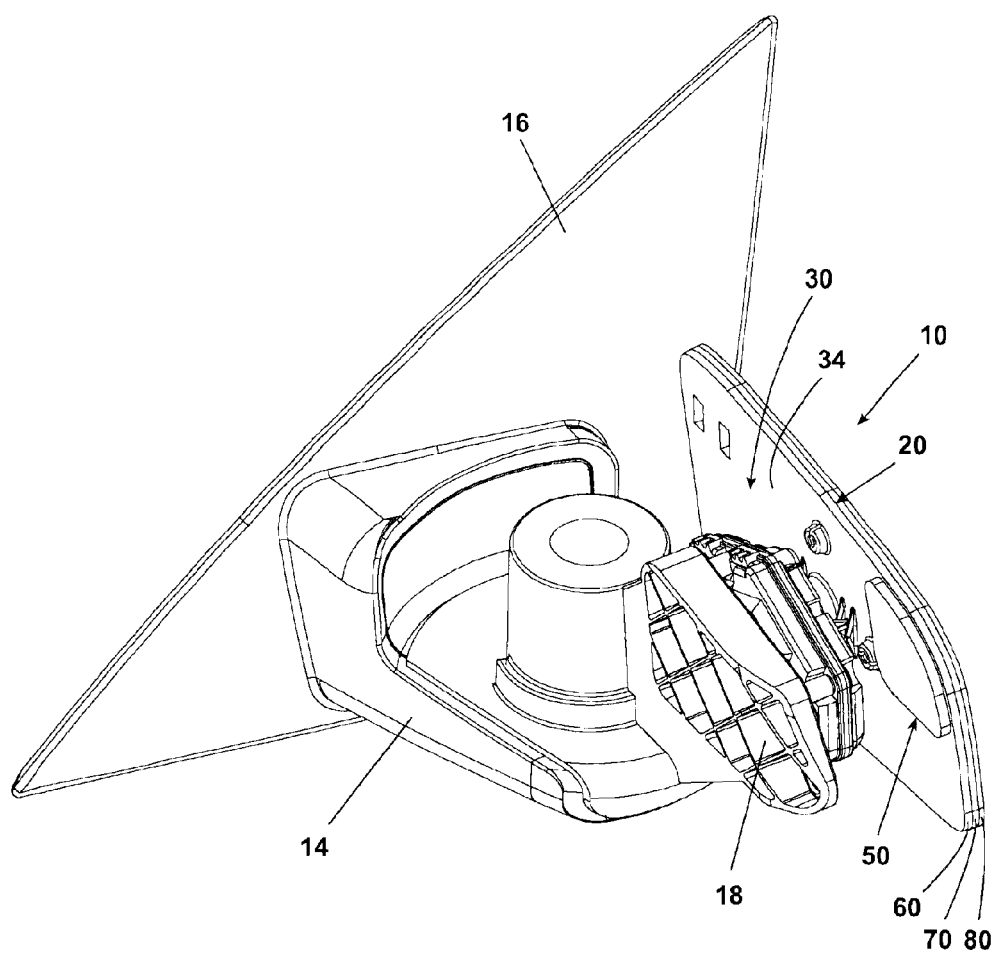
FIG. 3 is a close-up perspective view of the interior of the rearview mirror system of FIG. 1 showing a multi-element reflective element assembly comprising an automatically dimming spotter mirror.

As shown also in FIGS. 2 and 3, the rearview mirror system 10 comprises several elements of a well-known rearview mirror assembly, including a shell 14 and a reflective element assembly 20, which are mounted to the vehicle 12 in a generally conventional manner through a base 16 and a mounting frame 18.

Figure 4:
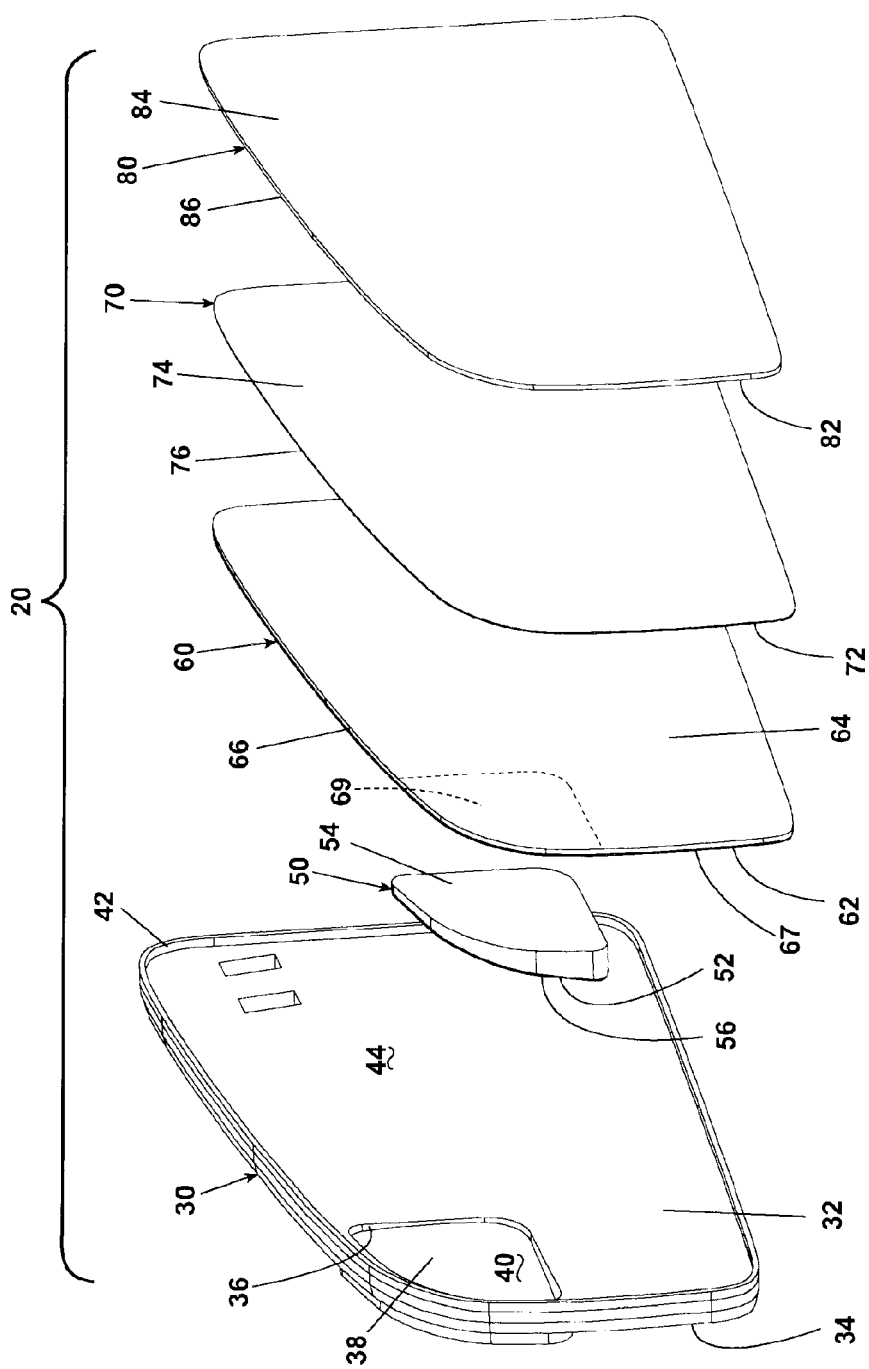
FIG. 4 is an exploded view of the reflective element assembly of FIG. 3 showing the spotter mirror.

The reflective element assembly 20 comprises a multi-component mirror system. Referring to FIG. 4, the reflective element assembly 20 comprises a reflective element carrier 30 and a spotter mirror 50. The reflective element carrier 30 is a generally plate-like structure having a reflective element face 32 and a mounting face 34. The perimeter of the reflective element carrier 30 is adapted so that the reflective element carrier 30 will fit closely within the shell 14. The reflective element assembly 20 can also comprise an inner glass 60, an electrochromic layer 70, and an outer glass 80 assembled into a "sandwiched" structure. Additional elements (not shown) can selectively include a heater/defroster element, turn signals, puddle lights, and the like.

Depending orthogonally from the reflective element face 32 is an irregularly-shaped perimetric pocket wall 36 which terminates in a pocket floor 38 in spaced-apart juxtaposition with the reflective element face 32 to define a spotter mirror pocket 40. The pocket wall 36 is adapted to correspond with the shape of the spotter mirror 50 for cooperative register of the spotter mirror 50 in the spotter mirror pocket 40. Extending orthogonally upwardly from the reflective element face 32 is a perimeter wall 42 which together form a mirror receptacle 44.

Figure 5A:
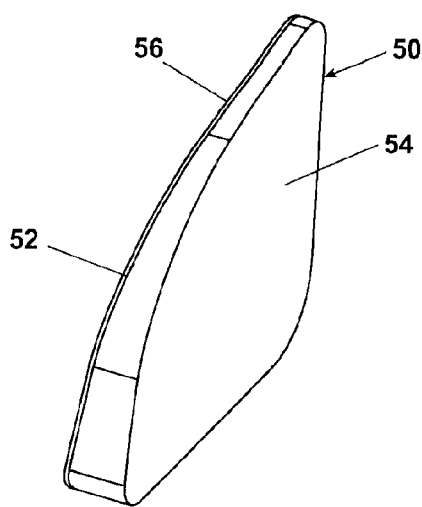
FIG. 5A is a perspective view of the spotter mirror of FIG. 4.
Figure 5B:
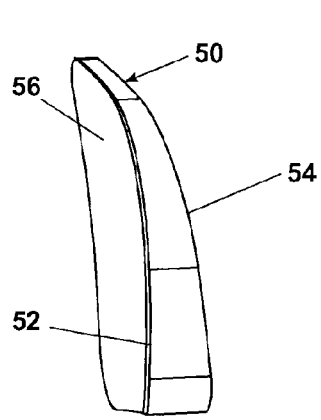
FIG. 5B is a side elevational view of the spotter mirror of FIG. 4.
Figure 5C:
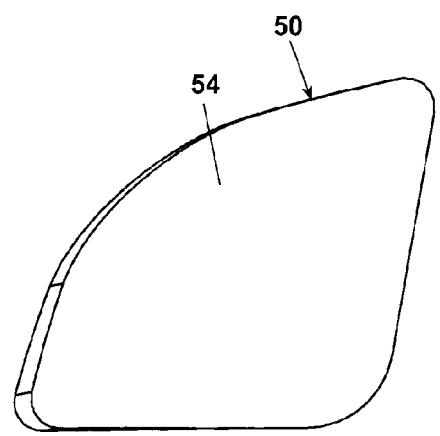
FIG. 5C is a front elevational view of the spotter mirror of FIG. 4.

As shown in FIGS. 5A–C, in the preferred embodiment the spotter mirror 50 is an irregularly-shaped piece having a rear face 52 and a front face 54. Alternatively, the spotter mirror 50 can have a regular shape such as a circular or rectilinear configuration. In the preferred embodiment, the rear face 52 comprises a concave surface and the front face 54 comprises a flat surface. A reflective layer 56 extends over the rear face 52 to form a convex mirror for light passing through the spotter mirror 50 from the front face 54 to impinge on the reflective layer 56. Alternatively, the rear face 52 can be planar with a pixelated or faceted surface to provide the same light-reflecting characteristics as a convex mirrored surface. The spotter mirror 50 is adapted to fit closely in the spotter mirror pocket 40 so that the front face 54 is coplanar with the reflective element face 32.

Figure 6:
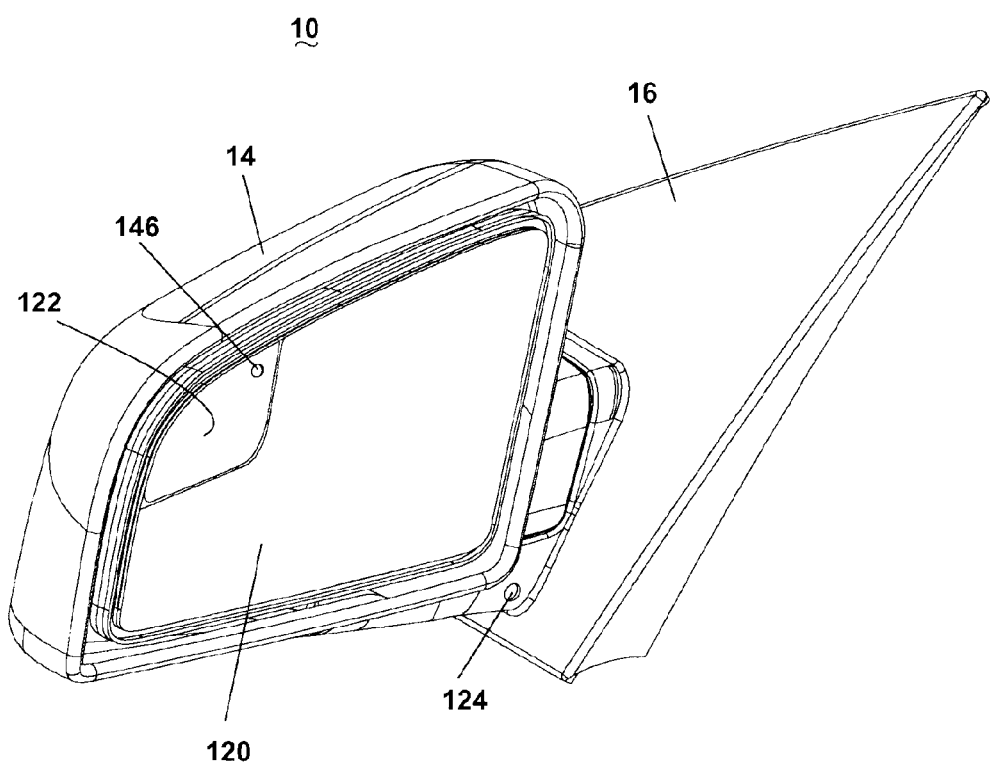
FIG. 6 is a close-up perspective view of an alternate embodiment of the rearview mirror system of FIG. 1 showing the blind zone spotter mirror and a sensing element incorporated therein comprising elements of a recognition enhancement device according to the invention.

Referring now to FIG. 6, an embodiment of the rearview mirror system 10 comprises a reflective element 120, a spotter mirror 122, and a recognition enhancement device 126 (FIGS. 9A–14B) for detecting and signaling the presence of an overtaking vehicle entering the blind zone of the vehicle 12. The recognition enhancement device as shown in FIG. 6 comprises a sensing element 124, as more fully described herein, and a signal light 146. The sensing element 124 is shown incorporated into the shell 14 in proximity to the base 16. Alternatively, the sensing element 124 can be incorporated into the rearview mirror system 10 at other locations on or in the shell 14, or placed on or in other vehicle surfaces, such as quarter panels, bumpers, fenders, etc. appropriate to its function of detecting the presence of a vehicle in the operator's blind zone. The sensing element 124 can comprise part of a detection and signaling system based on any of a number of well-known technologies, such as infrared, optical, radar, sonar or ultrasonic. The signal light is shown incorporated into the spotter mirror 122.

Figure 7:
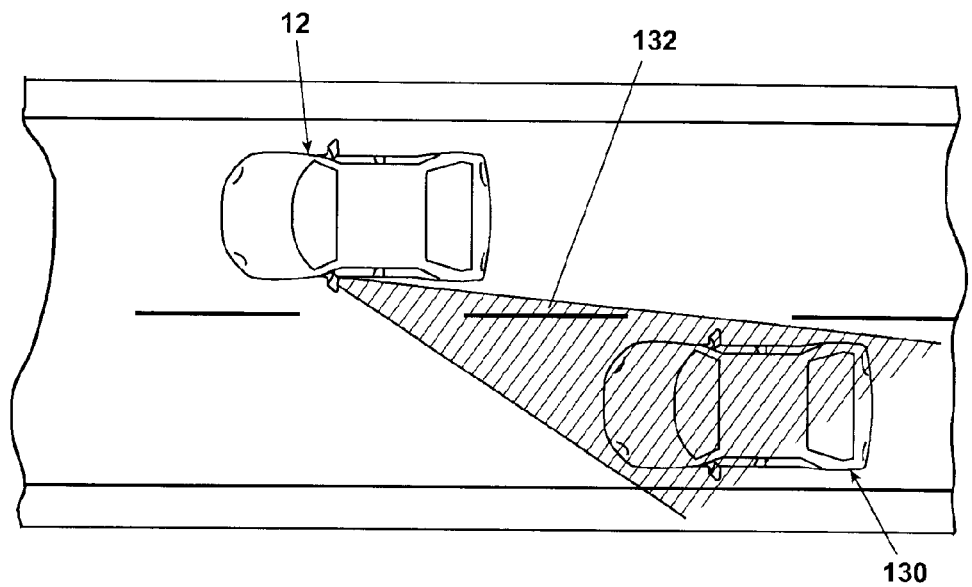
FIG. 7 is an overhead view of a first vehicle being overtaken by a second vehicle which has entered the first vehicle's blind zone.

FIG. 7 shows the vehicle 12 being overtaken by a second vehicle 130 which has entered the blind zone of the vehicle 12, shown as the shaded area identified by the numeral 132. During the time that the second vehicle 130 is in the blind zone 132, the operator of the vehicle 12 will be unable to observe the second vehicle 130 with the inside rearview mirror, the outside rearview mirror system, or peripheral vision. A spotter mirror, such as the spotter mirror 122 shown in FIG. 6, enables the operator to observe the second vehicle 130. However, the operator must purposefully monitor the spotter mirror in order to observe the second vehicle 130. The operation of the sensing element 124, in combination with signaling devices hereinafter described, such as the signal light 146, will alert the operator to the presence of the second vehicle 130 and will direct the operator's attention to the spotter mirror 122 in which an image of the vehicle 130 can be observed.

Figure 8:
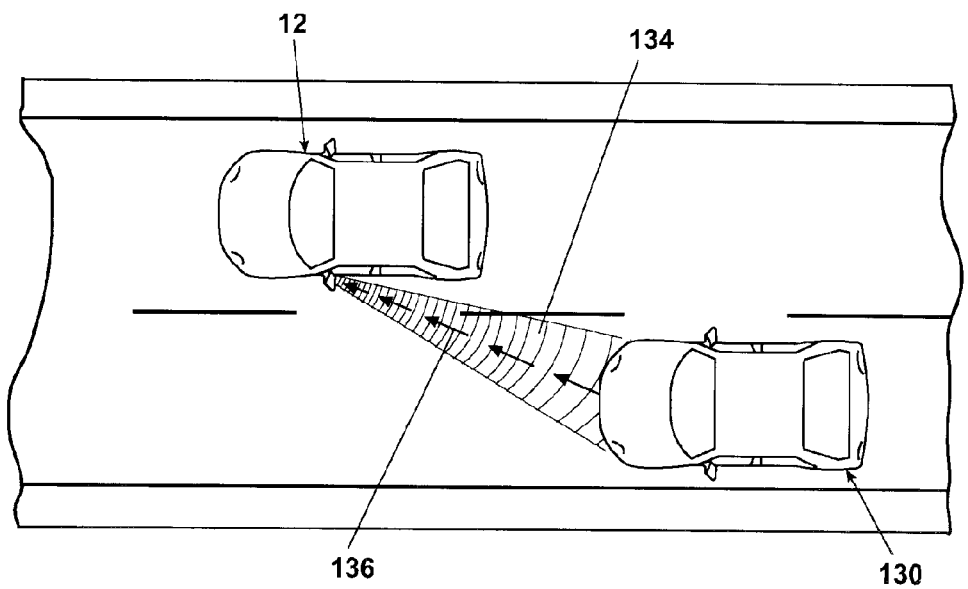
FIG. 8 is an overhead view of the second vehicle of FIG. 7 being detected by the recognition enhancement device of FIG. 6 comprising a portion of the rearview mirror system of the first vehicle.

Side and rear object detection systems for motor vehicles are well-known in the art and are suitable for the detection and signaling system discussed herein as the concept described herein relates to the placement of the signaling device and not to the particular type of detection system employed. Referring now to FIG. 8, a generally conventional side object detection system detects a vehicle 130 in the operator's blind zone by use of, e.g., an infrared, radar, sonar or ultrasonic transmission and reception device in a manner well-known in the art. The side object detection system operates by transmitting a signal, identified in FIG. 8 by the numeral 134, rearward of the vehicle into the operator's blind zone. This signal 134 can be transmitted into the blind zone through a suitable transmitter placed at a suitable location on or in the vehicle 12, such as the shell 14. If a second vehicle 130 has entered the blind zone, the signal 134 will be reflected back toward the vehicle 12 (the reflected signal is identified in FIG. 8 by the numeral 136) to be sensed by the sensing element 124.

Referring to FIGS. 9A–14B, the recognition enhancement device 126 comprises a well-known signal transmission device (not shown), the sensing element 124, a controller 140, one or more signaling or display devices 146, 150, 152, 154, 158, 162, 164, and connecting electrical leads 142, 144, 156. The embodiments shown in FIGS. 9A–14B operate in a generally similar fashion. The presence of a vehicle 130 in the blind zone 132 activates the recognition enhancement device 126 when a reflected signal 136 from the vehicle 130 is received by the sensing element 124. An electrical signal is sent from the sensing element 124 to the controller 140, which in turn sends a signal to the signaling or display device 122, 158. The signaling or display device 122, 158 alerts the operator to the presence of the vehicle 130 in the blind zone 132. The operator then observes an image 148 of the vehicle 130 in the spotter mirror 122 or the display device 158.

Figure 9A:
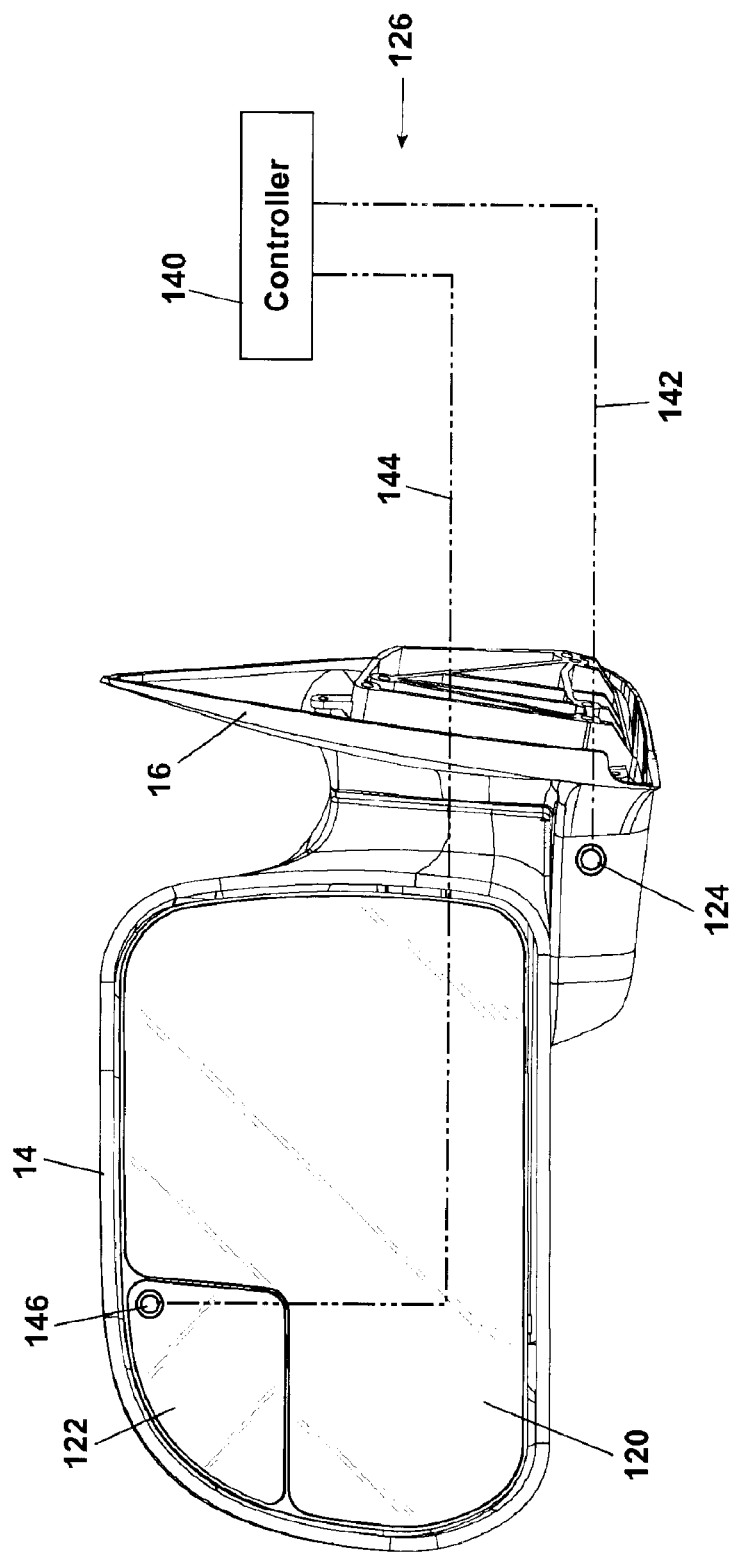
FIG. 9A is a close-up view of an alternate embodiment of the recognition enhancement device of FIG. 6.
Figure 9B:
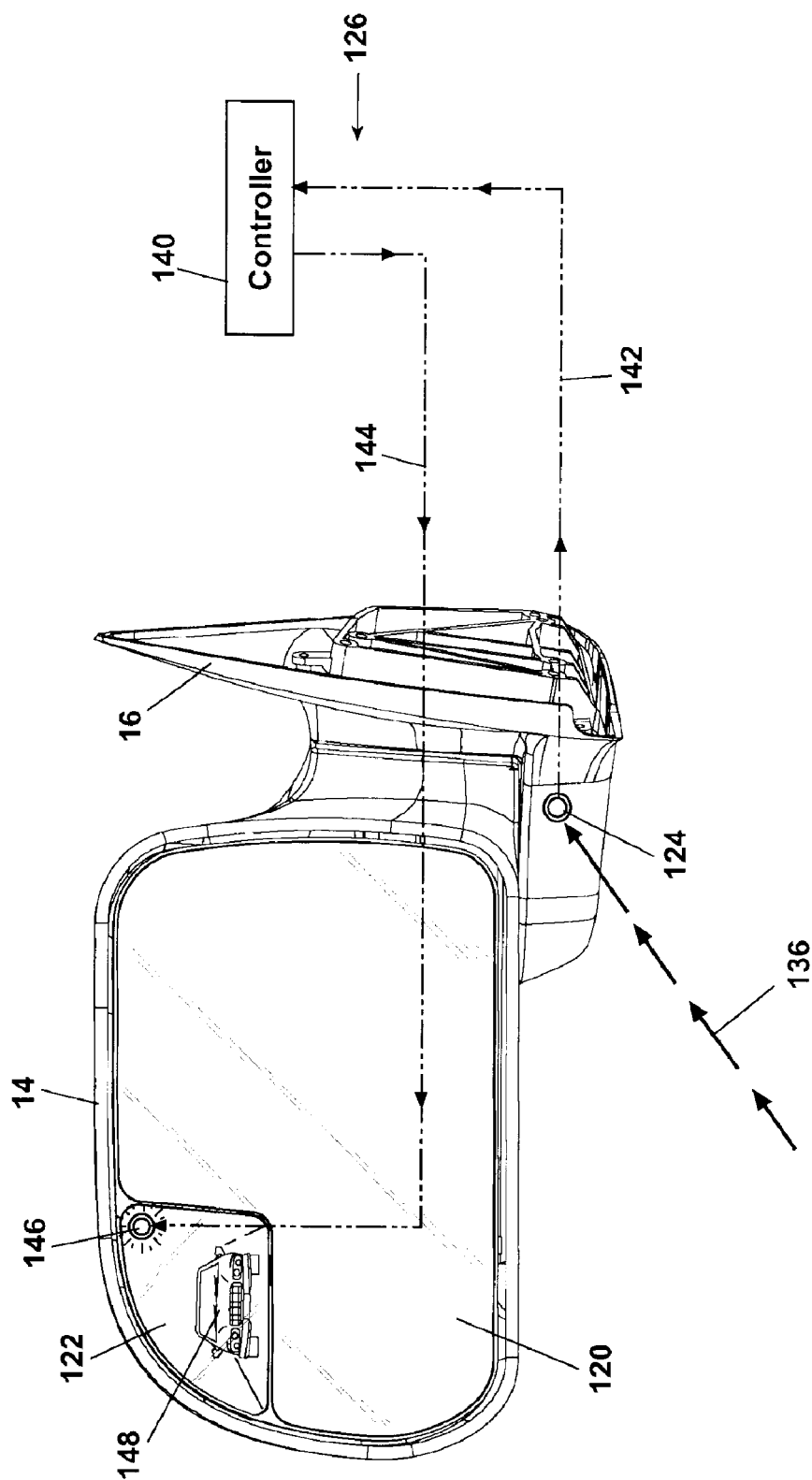
FIG. 9B is a close-up view of the rearview mirror system of FIG. 9A activated by a vehicle entering the blind zone.

As shown in FIG. 9A, the sensing element 124 is electrically connected to a controller 140 through a suitable sensing lead 142. The controller 140 is a generally conventional computer-based controller suitable for processing electrical input signals and generating functional output signals in response thereto. The controller 140 is connected through a suitable signaling lead 144 to a signal light 146. The signal light 146 is shown in FIG. 9A as a single point-type light mounted in or behind a corner of the spotter mirror 122, although it will be understood, as illustrated in FIGS. 10A–14B, that the signal light 146 may be replaced with different embodiments of a signaling element. In the absence of a signal from the controller 140, the signal light 146 remains inoperative, as shown in FIG. 9A. Referring to FIG. 9B, when a vehicle enters the blind zone 132, the reflected signal 136 will be sensed by the sensing element 124, which will then send an electrical signal through the sensing lead 142 to the controller 140. The controller 140 will then respond by sending an electrical current through the signaling lead 144 to the signal light 146 thereby illuminating the signal light 146. The controller 140 can be programmed to provide an electrical current that is constant, thereby providing a constant illumination of the signal light 146, or intermittent, thereby causing the signal light 146 to flash intermittently. The illumination of the signal light 146 will draw the operator's attention to the spotter mirror 122 where the image 148 of the overtaking vehicle 130 can be observed. The illumination of the signal light 146 can also be accompanied by an audio signal from a suitable audio transmitter located inside the vehicle to further alert the operator to the need to monitor the spotter mirror 122.

Referring now to FIG. 9A, an embodiment of the invention is shown in which a point-type signal light 146 is mounted in the upper inside corner of the spotter mirror 122. The signal light 146 is operably connected through an electrical signaling lead 144 to the controller 140, which is in turn connected through an electrical sensing lead 142 to the sensing element 124. As shown in FIG. 9B, when a vehicle 130 enters the blind zone 132, the sensing element 124 will receive the signal 136 from the vehicle 130. This will be transmitted to the controller 140 which will then send a signal through the signaling lead 144 to the signal light 146 which will operate to alert the driver to the presence of the vehicle 130 in the blind zone 132. The driver's attention will thus be drawn to the spotter mirror 122 in which an image 148 of the vehicle 130 will be observed.

Figure 10A:
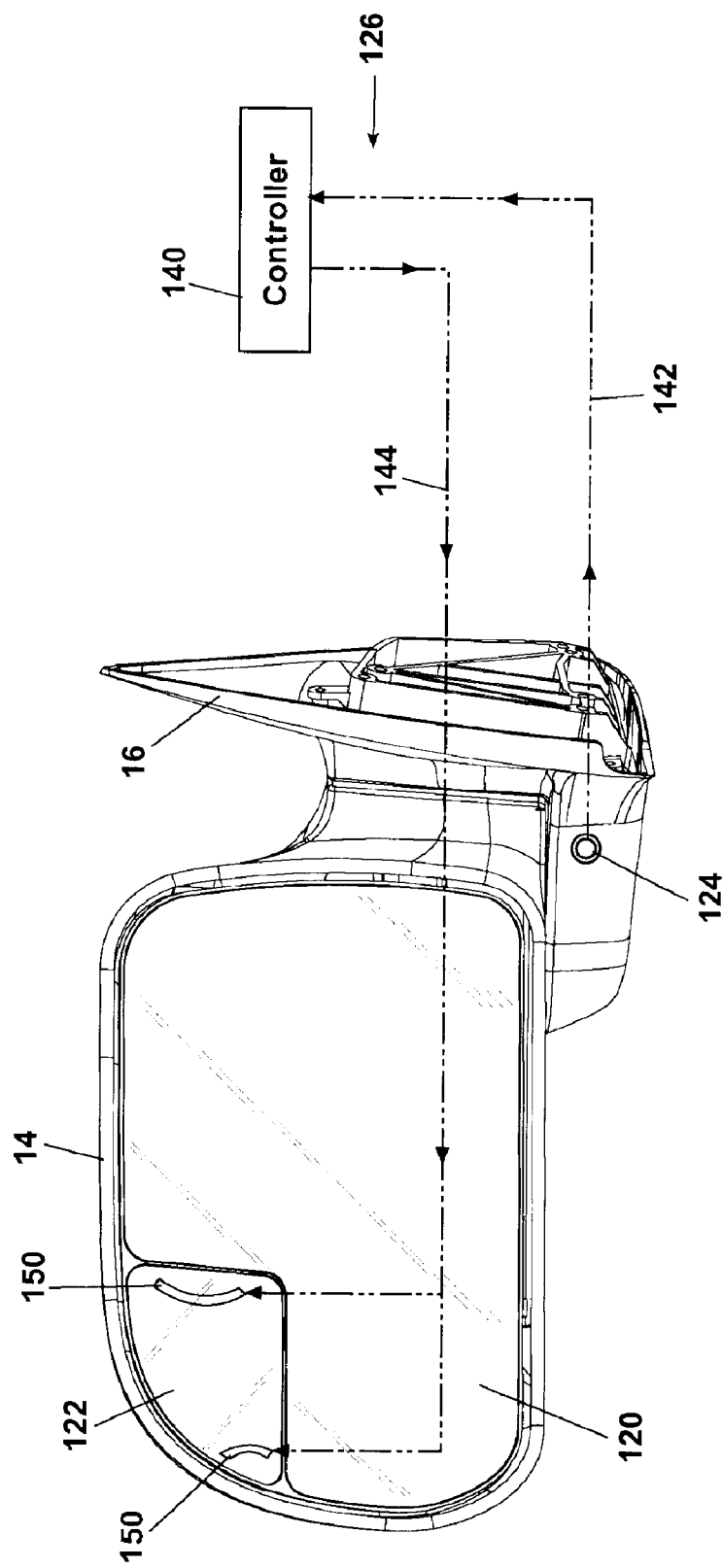
FIG. 10A is a close-up view of an alternate embodiment of the recognition enhancement device of FIG. 6.
Figure 10B:
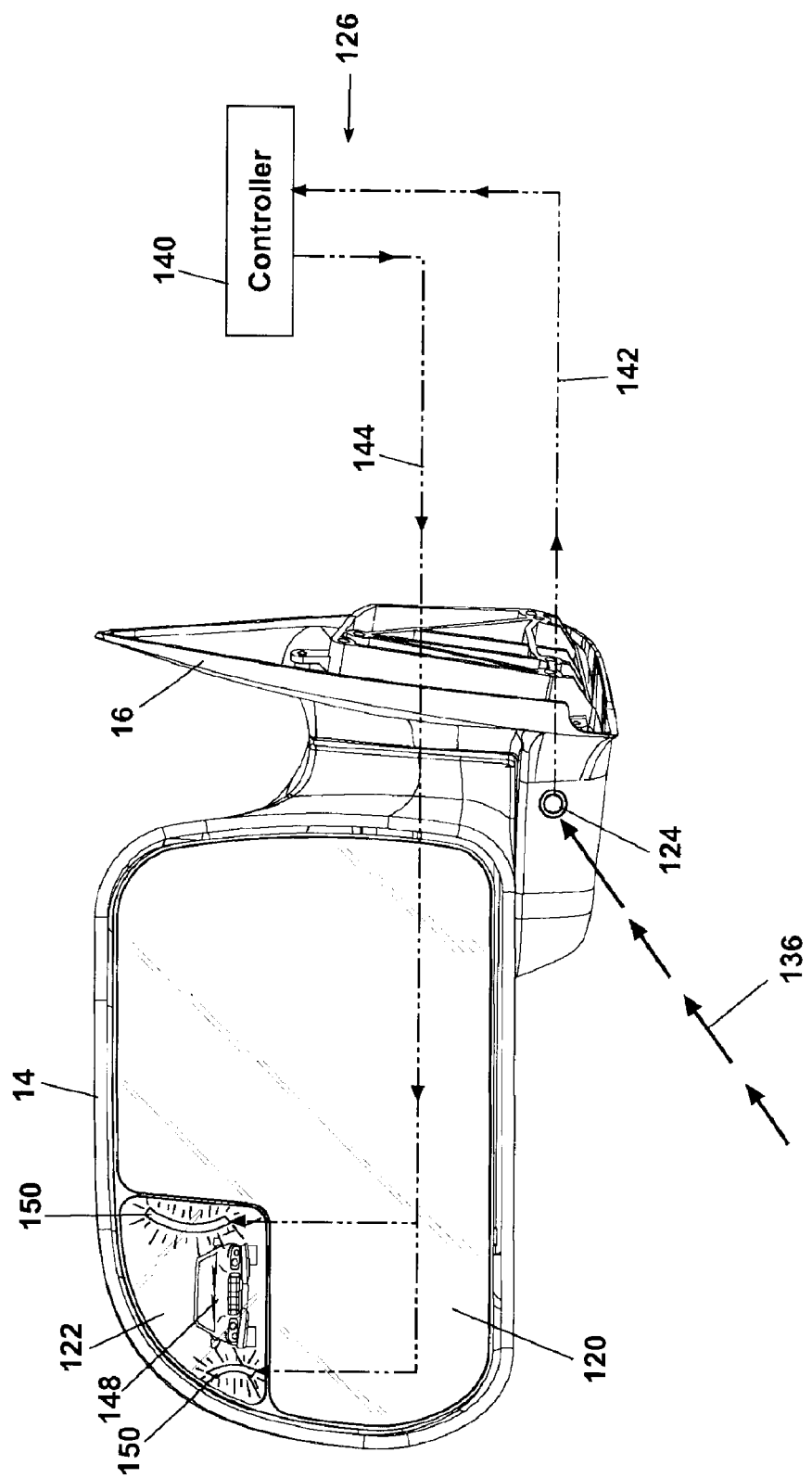
FIG. 10B is a close-up view of the rearview mirror system of FIG. 10A activated by a vehicle entering the blind zone.

FIG. 10A shows an embodiment comprising an alternative configuration of signal lights. In this embodiment, signal markers 150, similar to those utilized for mirror-integrated turn signals, are placed on either side of the spotter mirror 122. As shown in FIG. 10B, in a manner similar to that shown in FIG. 9B, the presence of a vehicle 130 in the blind zone 132 will initiate the activation of the signal markers 150, alerting the driver to the presence of the vehicle 148 and drawing the driver's attention to the spotter mirror 122.

Figure 11A:
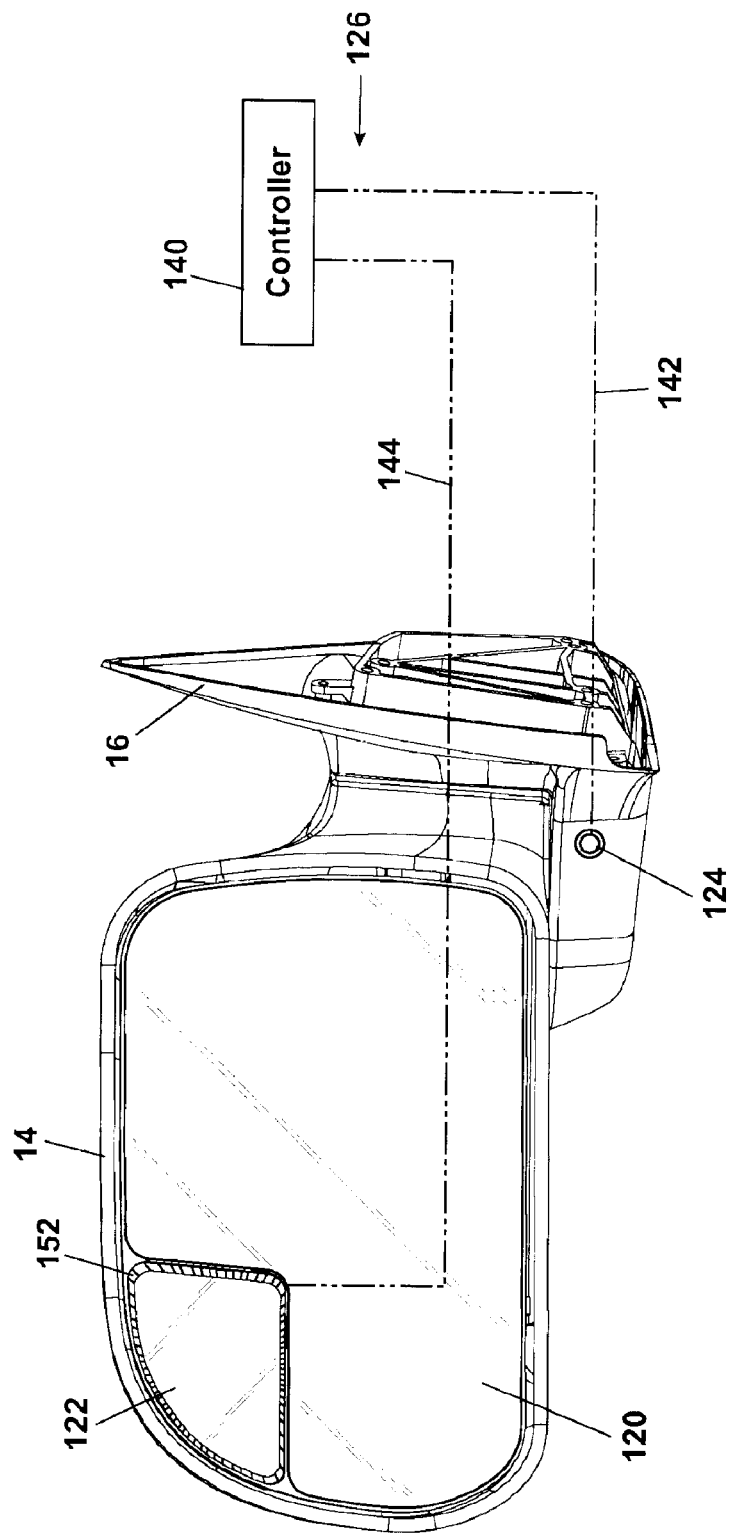
FIG. 11A is a close-up view of an alternate embodiment of the recognition enhancement device of FIG. 6.
Figure 11B:
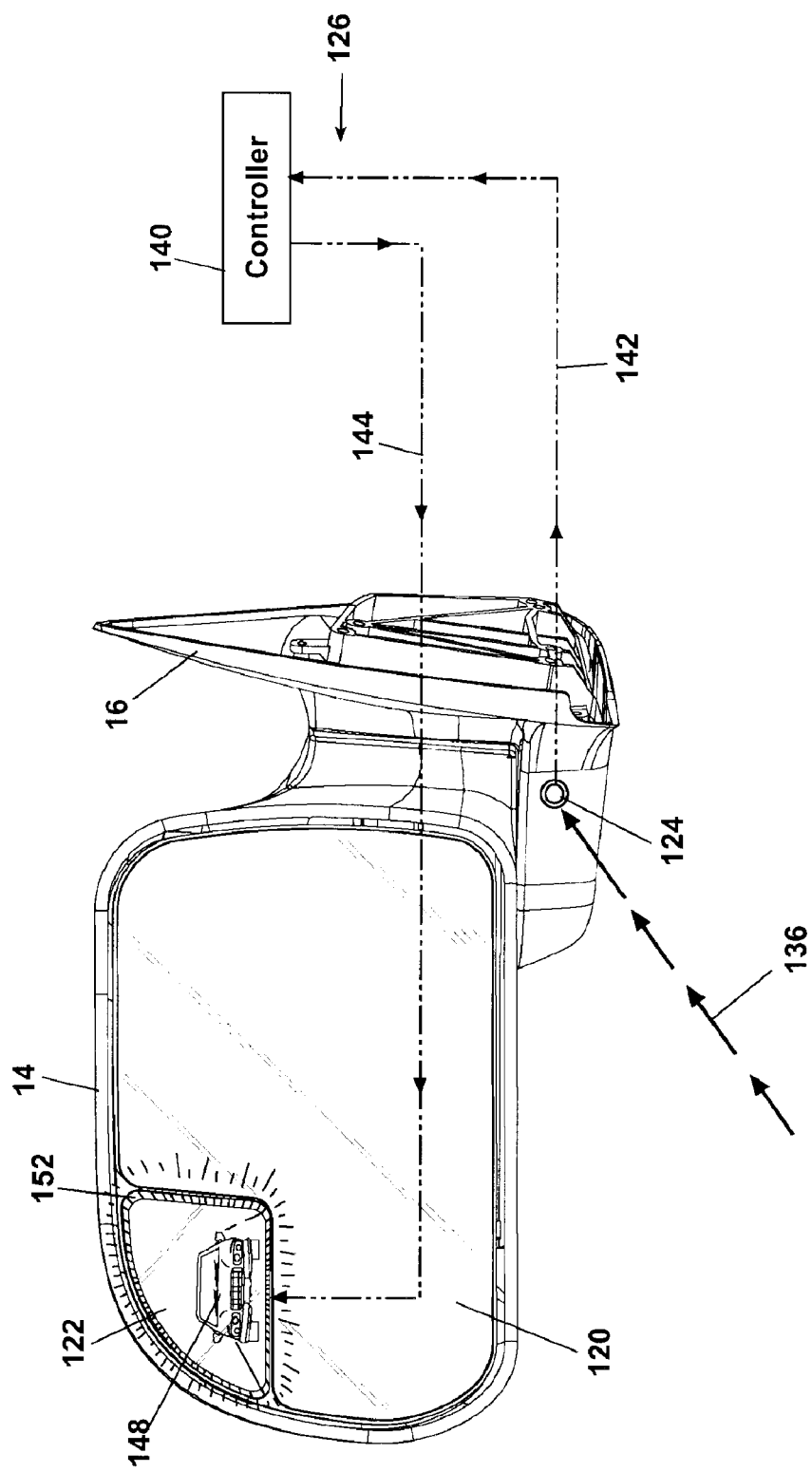
FIG. 11B is a close-up view of the rearview mirror system of FIG. 11A activated by a vehicle entering the blind zone.

As shown in FIGS. 11A and 11B, the signaling light can comprise a peripheral signal light 152 placed along the periphery of the spotter mirror 122. The presence of a vehicle 130 in the blind zone 132 will initiate the activation of the peripheral signal light 152, thereby framing the image 148 of the vehicle 130 in the spotter mirror 122.

Figure 12A:
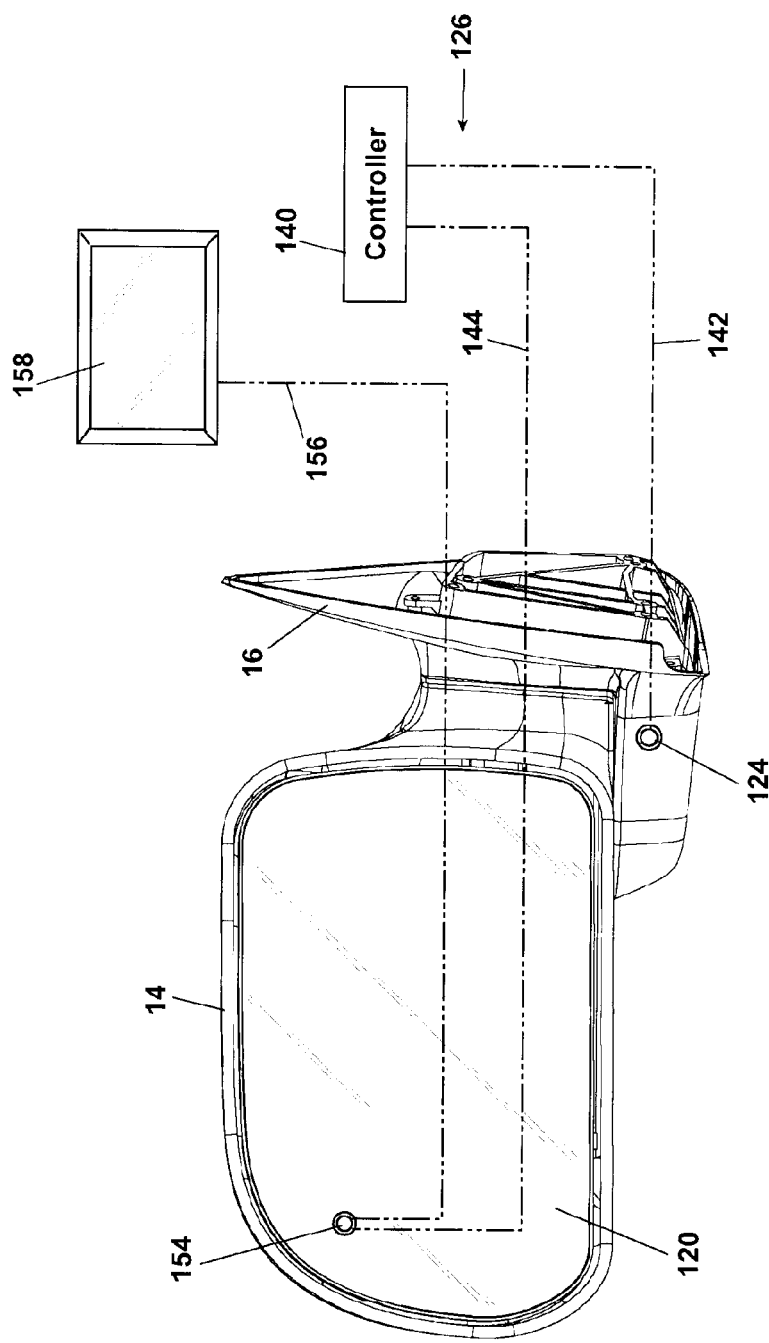
FIG. 12A is a close-up view of an alternate embodiment of the recognition enhancement device of FIG. 6.
Figure 12B:
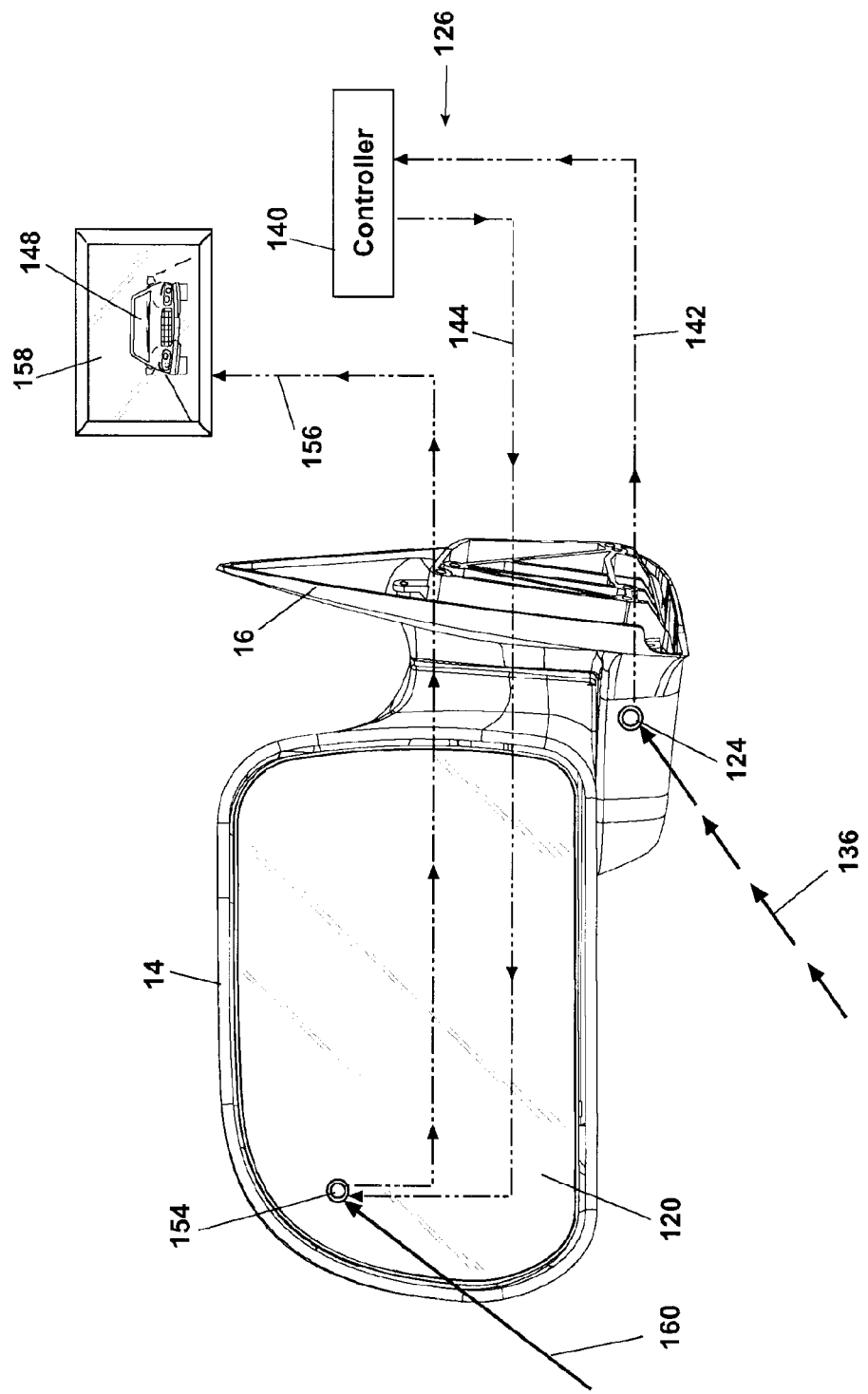
FIG. 12B is a close-up view of the rearview mirror system of FIG. 12A activated by a vehicle entering the blind zone.

FIGS. 12A and 12B show an embodiment that replaces the spotter mirror 122 with a remote display 158 receiving visual transmissions from a small camera element 154 incorporated into the rearview mirror system 10. The remote display 158 can comprise a well-known cathode ray-type television monitor, a liquid crystal display, a plasma display, or the like. The sensing element 124 is electrically connected to the controller 140 through the sensing lead 142. Preferably, the camera element 154 is mounted behind the reflective element 120 within the shell 14, with the reflective element 120 adapted so that the camera element 154 has an unobstructed view of the blind zone 132. The controller 140 is electrically connected to the camera element 154 through the signaling lead 144, and the camera element 154 is operably connected to a display element 158 through an image lead 156. The display element 158 can be mounted at appropriate location within the vehicle, or can be incorporated into the rearview mirror system 10. The presence of the overtaking vehicle 130 in the blind zone 132 will be sensed by the sensor 124, which will send a signal to the controller 140. The controller 140 will then send a signal to the camera element 154 which will begin operation and will receive an image of the vehicle 130, represented by the image vector 160. The camera element 154 transmission will be sent to the display element 158 where the image 148 will be displayed. Alternatively, the image from the camera element 154 can be projected onto the windshield utilizing conventional "heads-up display" (HUD) technology.

Figure 13A:
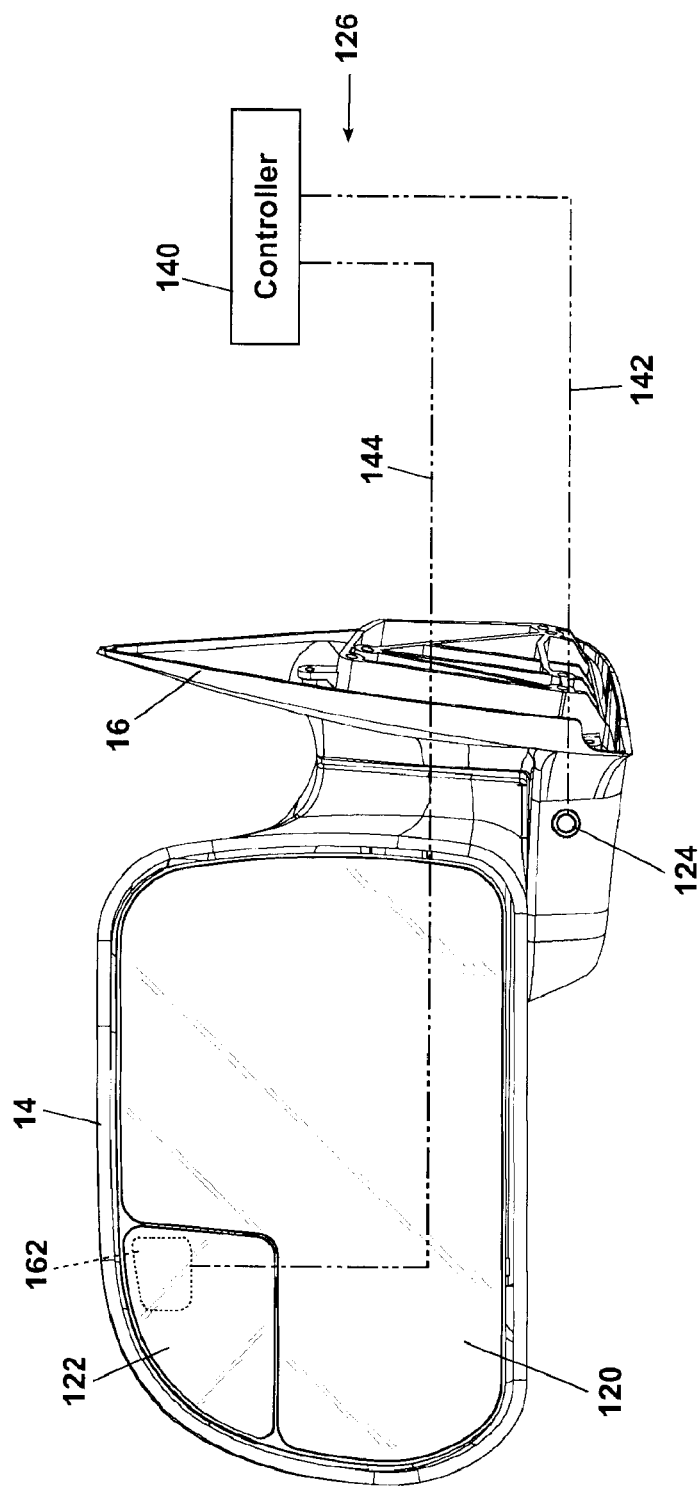
FIG. 13A is a close-up view of an alternate embodiment of the recognition enhancement device of FIG. 6.
Figure 13B:
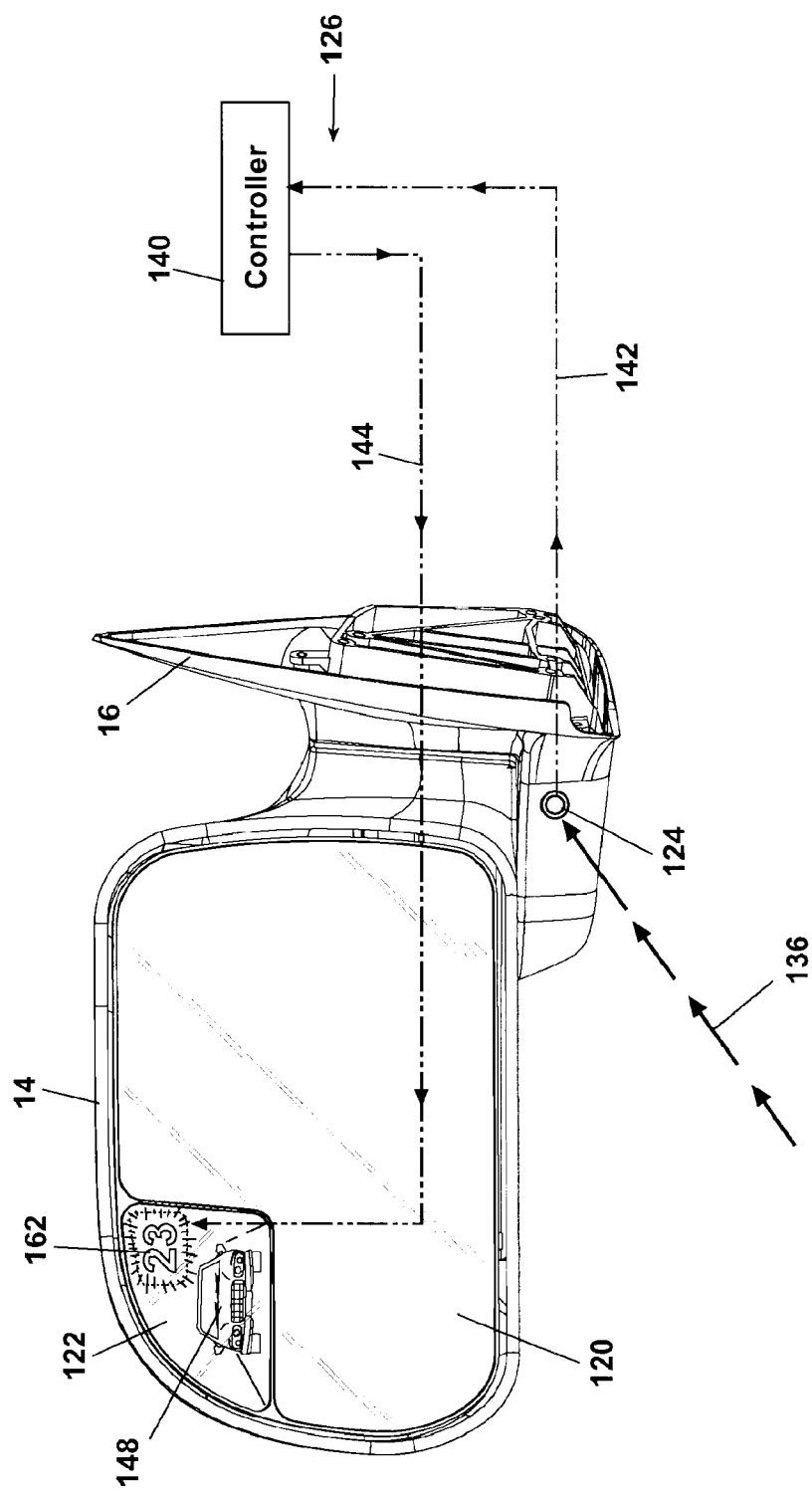
FIG. 13B is a close-up view of the rearview mirror system of FIG. 13A activated by a vehicle entering the blind zone.

FIGS. 13A and 13B show yet another embodiment in which the spotter mirror 122 is provided with a numerical display 162. When the overtaking vehicle 130 enters the blind zone 132, the display is activated as heretofore described with numerical information, such as the distance of the overtaking vehicle 130 from a preselected reference point on the vehicle 12. The numerical information can be displayed as a continuous or blinking indicator.

Figure 14A:
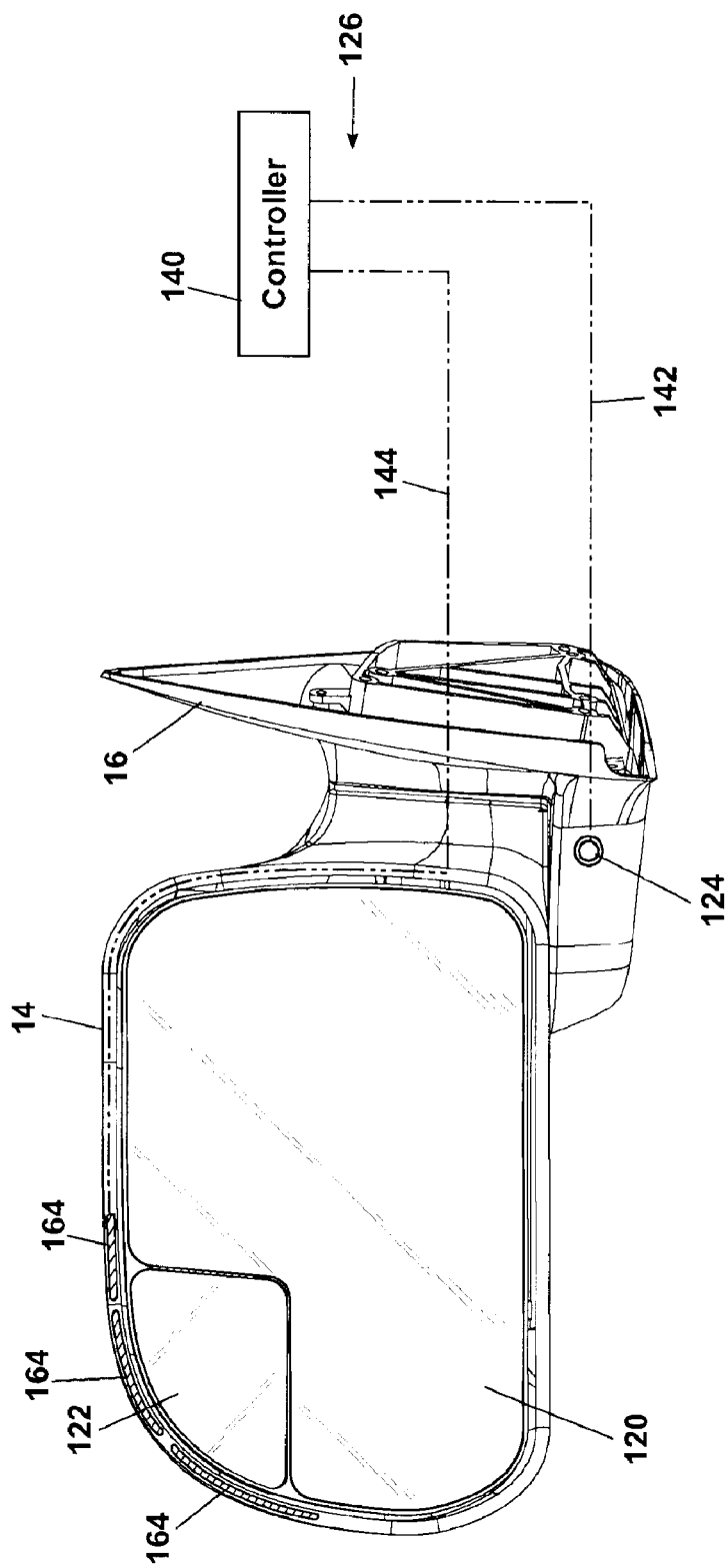
FIG. 14A is a close-up view of an alternate embodiment of the recognition enhancement device of FIG. 6.
Figure 14B:
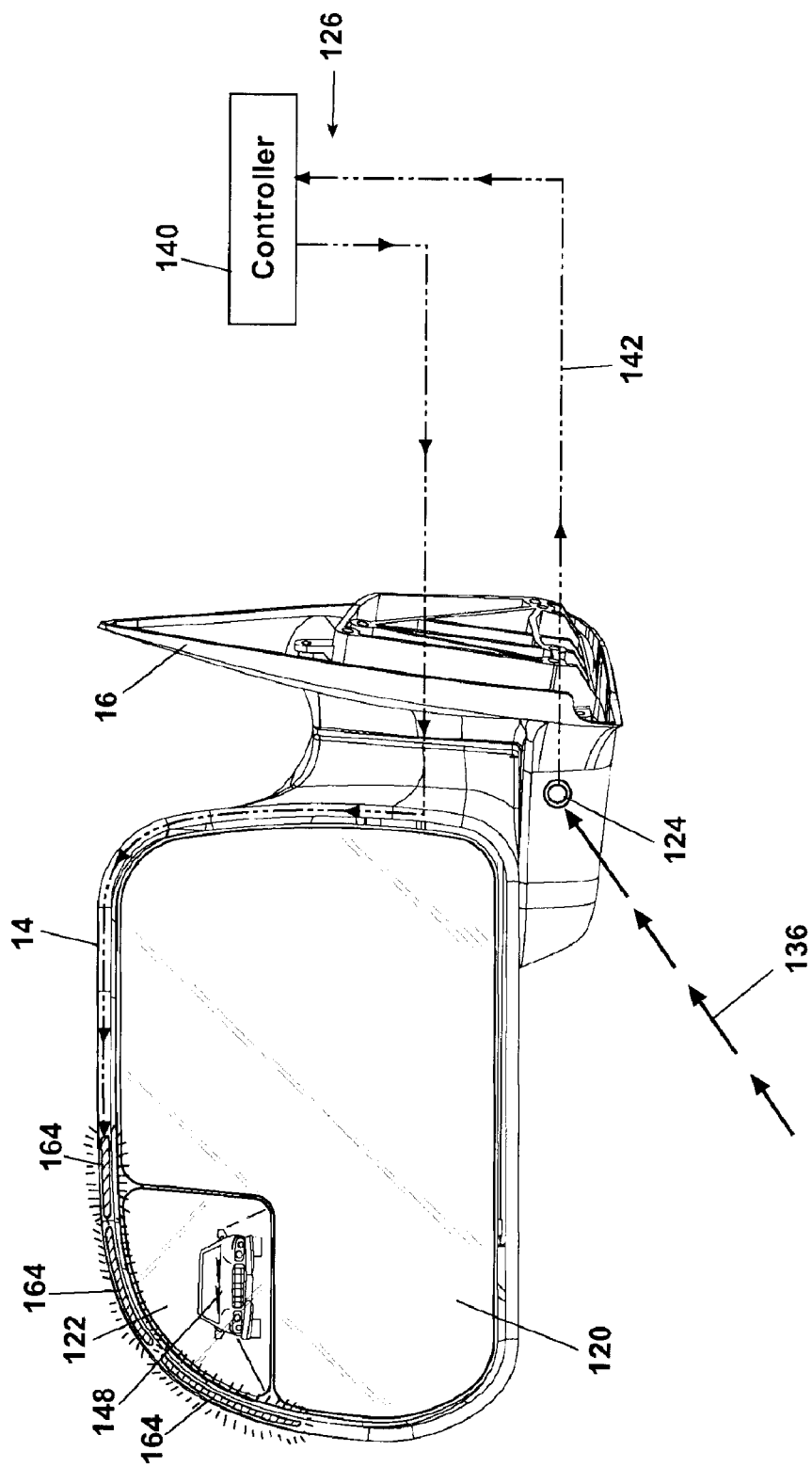
FIG. 14B is a close-up view of the rearview mirror system of FIG. 14A activated by a vehicle entering the blind zone.

FIGS. 14A and 14B show another embodiment of the invention in which signal lights 164 are incorporated into the shell 14 adjacent the spotter mirror 122. The signal lights 164 will be activated when an overtaking vehicle 130 enters the blind zone 132 as previously described. The signal lights 164 are shown in FIGS. 14A and B as generally elongated lighting elements. However, the signal lights 164 can assume any appropriate preselected shape, including a mixture of shapes appropriate for drawing the driver's attention to the spotter mirror 122.

Referring again to FIG. 4, an alternate embodiment of the recognition enhancement device is shown which will induce the operator to observe an object in the spotter mirror during nighttime driving. The recognition enhancement device comprises the inner glass 60, the electrochromic layer 70, and the outer glass 80. The inner glass 60 is a generally plate-like, irregularly-shaped piece of transparent material such as glass or clear plastic adapted to fit closely within the mirror receptacle 44. The inner glass 60 has a rear face 62, a front face 64, and a perimeter edge 66. A reflective layer 67 extends over the rear face 62 to form a mirror for light passing through the inner glass 60, the electrochromic layer 70, and the outer glass 80 to impinge on the reflective layer 67, except for a spotter zone 69 corresponding in configuration and location to the spotter mirror 50. The inner glass 60 is mounted in the mirror receptacle 44 so that the rear face 62 with the reflective layer 67 is in contact with the reflective element face 32 and the perimeter edge 66 is in contact with the perimeter wall 42.

The electrochromic layer 70 comprises an electrochromic compound, such as an electrochromic gel, capable of darkening in response to the detection of light from an external light source, such as described in U.S. Pat Nos. 4,902,108 and 4,917,477, which are incorporated herein by reference. The electrochromic layer 70 is conventionally sealed between the inner glass 60 and the outer glass 80. Alternatively, the electrochromic compound can comprise a color-changing polymer comprising a generally solid, rather than gel-like, layer.

The outer glass 80 is a generally plate-like irregularly-shaped piece of translucent material such as glass or clear plastic having a rear face 82, a front face 84, a perimeter edge 86, and an areal shape identical to the shape of the inner glass 60. The rear face 82 is in contact with the electrochromic layer 70 "sandwiched" between the inner glass 60 and the outer glass 80. The outer glass 80 is adapted so that the perimeter edge 86 is in alignment with the perimeter edge 66 and the perimeter edge 76 for contact with the perimeter wall 42. The outer glass 80, electrochromic layer 70, and inner glass 60 are assembled into the layered structure in a generally conventional manner well-known in the industry.

When the reflective element carrier 30, the spotter mirror 50, the inner glass 60, the electrochromic layer 70, and the outer glass 80 are assembled, the reflective element assembly 20 will comprise a rearview mirror system 10 having a spotter mirror 50 for eliminating the blind zone typically experienced by a driver utilizing a rearview mirror without a spotter mirror. However, the positioning of the spotter mirror 50 behind the electrochromic layer 70 will provide for automatic dimming of both the rearview mirror and the spotter mirror 50, thereby reducing the concentrated glare experienced by a driver from a following vehicle using its headlamps for nighttime driving. Thus, the operator will be alerted to the presence of the following vehicle and will be able to observe an image of the vehicle unaffected by the high intensity light typically reflected from a non-dimming spotter mirror.

The embodiments shown in exemplary form in FIGS. 9A–14B can be combined with the embodiment described and shown in FIG. 4 to provide a rearview mirror system comprising a recognition enhancement device effective for both daytime and nighttime driving.

While the invention has been specifically described in connection with certain specific embodiments thereof, it is to be understood that this is by way of illustration and not of limitation, and the scope of the appended claims should be construed as broadly as the prior art will permit.

What is claimed is:

1. A vehicular rearview mirror system for indicating to a vehicle operator the detection of an object in the vehicle's blind zone, comprising:
   a first reflective element for providing the operator with a rearward view;
   a second reflective element associated with the first reflective element that is adapted to provide an image to the operator of the object in the vehicle's blind zone adjacent to the rearward view which is not generally observable by the operator in the rearward view; and
   a recognition enhancement device associated with at least the second reflective element for enhancing the operator's recognition of the object in the vehicle's blind zone, wherein the recognition enhancement device is actuated upon detection of the object in the vehicle's blind zone to effectively draw the operator's visual attention to the second reflective element.

2. The vehicular rearview mirror system of claim 1 wherein the recognition enhancement device comprises a transmission device for transmitting into the blind zone a signal adapted for reflection from the object.

3. The vehicular rearview mirror system of claim 2 wherein the signal comprises one of an infrared, optical, radar, sonar or ultrasonic signal.

4. The vehicular rearview mirror system of claim 2 wherein the recognition enhancement device comprises a sensing element for sensing the signal reflected from an object in the blind zone.

5. The vehicular rearview mirror system of claim 1 wherein the recognition enhancement device comprises a signaling device.

6. The vehicular rearview mirror system of claim 5 wherein the signaling device comprises at least one point-type light.

7. The vehicular rearview mirror system of claim 6 wherein the at least one point-type light comprises at least one incandescent light.

8. The vehicular rearview mirror system of claim 6 wherein the at least one point-type light comprises at least one light-emitting diode.

9. The vehicular rearview mirror system of claim 5 wherein the signaling device comprises at least one illuminated signal marker.

10. The vehicular rearview mirror system of claim 9 wherein the at least one illuminated signal marker comprises at least one incandescent light.

11. The vehicular rearview mirror system of claim 9 wherein the at least one illuminated signal marker comprises at least one light-emitting diode.

12. The vehicular rearview mirror system of claim 5 wherein the signaling device comprises at least one remote display.

13. The vehicular rearview mirror system of claim 12 wherein the at least one remote display comprises a camera adapted to capture an image of the object in the vehicle's blind zone and one of a cathode ray-type television monitor, a liquid crystal display, or a plasma display for displaying the image of the object.

14. The vehicular rearview mirror system of claim 5 wherein the signaling device comprises at least one peripheral signal light extending along the periphery of the second reflective element.

15. The vehicular rearview mirror system of claim 14 wherein the at least one peripheral signal light comprises at least one incandescent light.

16. The vehicular rearview mirror system of claim 14 wherein the at least one peripheral signal light comprises at least one light-emitting diode.

17. The vehicular rearview mirror system of claim 5 wherein the signaling device comprises a numerical display for indicating the distance separating the vehicle from the object.

18. The vehicular rearview mirror system of claim 17 wherein the numerical display comprises at least one incandescent light.

19. The vehicular rearview mirror system of claim 17 wherein the numerical display comprises at least one light-emitting diode.

20. The vehicular rearview mirror system of claim 5 wherein the signaling device comprises at least one peripheral signal light extending along the periphery of the first reflective element.

21. The vehicular rearview mirror system of claim 20 wherein the at least one peripheral signal light comprises at least one incandescent light.

22. The vehicular rearview mirror system of claim 20 wherein the at least one peripheral signal light comprises at least one light-emitting diode.

23. The vehicular rearview mirror system of claim 1 wherein the recognition enhancement device comprises an electrochromic layer adapted to reduce the intensity of light transmitted from the object and reflected from the second reflective element.

24. The vehicular rearview mirror system of claim 23 wherein the electrochromic layer is adapted to darken upon detecting light from the object.

25. The vehicular rearview mirror system of claim 23 wherein the electrochromic layer is adapted to reduce the intensity of light reflected from both the first reflective element and the second reflective element.

* * * * *